US00RE38549E1

(19) United States
(12) Reissued Patent
Seebock

(10) Patent Number: US RE38,549 E
(45) Date of Reissued Patent: Jul. 6, 2004

(54) HANDCUFF KEY WITH ILLUMINATION

(75) Inventor: James John Seebock, Clark County, NV (US)

(73) Assignee: Streamlight, Inc., Eagleville, PA (US)

(21) Appl. No.: 10/068,416

(22) Filed: Feb. 5, 2002

Related U.S. Patent Documents

Reissue of:
(64) Patent No.: 6,244,722
Issued: Jun. 12, 2001
Appl. No.: 09/458,664
Filed: Dec. 10, 1999

(51) Int. Cl.[7] ..... F21L 33/00
(52) U.S. Cl. ..... 362/116; 362/119; 362/234; 362/800
(58) Field of Search ..... 362/109, 116, 362/234, 200, 201, 119, 800, 253; 70/456 R

(56) References Cited

U.S. PATENT DOCUMENTS

| | | | |
|---|---|---|---|
| 1,408,526 | A | 3/1922 | Lyhne |
| 1,955,511 | A | 4/1934 | Muros |
| 2,208,498 | A | 7/1940 | Cramer |
| 2,666,894 | A | 1/1954 | Babernitsh |
| 3,863,062 | A | 1/1975 | Caron |
| 4,085,315 | A | 4/1978 | Wolter et al. |
| 4,276,582 | A | 6/1981 | Burnett |
| 4,302,797 | A | 11/1981 | Cooper |
| 4,392,186 | A | 7/1983 | Cziment |
| 4,408,261 | A | 10/1983 | Polakoff |
| 4,433,365 | A | 2/1984 | Rousseau |
| 4,521,833 | A | 6/1985 | Wolter |
| D289,731 | S | 5/1987 | Mennie |
| 4,692,846 | A | 9/1987 | Johnson |
| 4,745,527 | A | 5/1988 | Belverio, Jr. et al. |
| 4,831,504 | A | 5/1989 | Nishizawa et al. |
| 4,864,474 | A | 9/1989 | Maglica |

(List continued on next page.)

OTHER PUBLICATIONS

Ralph Mroz, "Do Handcuffs Matter?", http://www.sw–psdw.com/psdw/news/00–9_handcuffs.htm, Sep. 2000, 2 Pages.
James L. Underwood, "NIJ Standard For Metallic Handcuffs", http://www.blacksteel.com/NIJ_Standard–0307.01.html, Mar. 1982, 9 Pages.
Galls, "State Seal Cuff Key From ASP", Http://www.galls.com/shop/viewProductDetail.jsp?item=RS063, 2001, 1 Page.
Galls, "Galls Round–Handle Swivel Cuff Key", http://www.galls.com/shop/viewProductDetail.jsp?item=Rs052, 2001, 2 Pages.

*Primary Examiner*—Stephen Husar
(74) *Attorney, Agent, or Firm*—Dann, Dorfman, Herrell & Skillman, P.C.

(57) ABSTRACT

A handcuff key that is partially enclosed in a grip housing having the ends of the handcuff key plate extending out of the grip housing. The external portions of the middle of the handcuff key plate are ribbed and attach to the external end portions of the handcuff key plate. The grip housing has a depression button on one side and a threaded notched cover that can be removed for cell replacement on the other. The grip housing includes a cell that sits in a recess on one side of the handcuff key plate and is lined with a circular conductive strip. The recess surrounds a hole that is integrated in with the structure of the key. An insulated wire is connected to the circular conductive strip and runs to the terminals of two light emitting diodes and then to another conductive strip that is affixed to the internal side of a depression button. The two light emitting diodes sit in grooved slots of the grip housing and face opposite each other toward the respective ends of the handcuff key plate. By depressing a depression button on the outside of the grip housing the conductive strip that is connected to the insulated wires contacts the cell through the handcuff key plate hole and forms a closed circuit so that the two light emitting diodes illuminate a light beam that will extend towards both ends of the key.

28 Claims, 4 Drawing Sheets

U.S. PATENT DOCUMENTS

| | | | |
|---|---|---|---|
| 5,158,356 | A | 10/1992 | Guthrie |
| 5,181,927 | A | 1/1993 | Song |
| 5,303,131 | A | 4/1994 | Wu |
| 5,386,351 | A | 1/1995 | Tabor |
| 5,457,613 | A | 10/1995 | Vandenbelt et al. |
| 5,460,022 | A | 10/1995 | Parsons |
| 5,515,249 | A | 5/1996 | Shiao |
| 5,541,817 | A | 7/1996 | Hung |
| D373,469 | S | 9/1996 | Hamilton |
| 5,568,741 | A | 10/1996 | Parsons |
| D375,372 | S | 11/1996 | Allen |
| 5,638,713 | A | 6/1997 | Roth et al. |
| 5,704,236 | A | 1/1998 | Parsons |
| D390,090 | S | 2/1998 | Tobin, Jr. |
| 5,713,656 | A | 2/1998 | Lin |
| 5,730,013 | A | 3/1998 | Huang |
| D393,407 | S | 4/1998 | Parsons |
| 5,772,308 | A | 6/1998 | Lin |
| 5,826,969 | A | 10/1998 | Nevin |
| 5,845,986 | A | 12/1998 | Breen |
| 5,882,106 | A | 3/1999 | Galli |
| D408,712 | S | 4/1999 | Parsons |
| 5,893,631 | A | 4/1999 | Padden |
| 5,937,680 | A | 8/1999 | Parsons |
| 6,109,073 | A | 8/2000 | Parsons |
| 6,132,058 | A | 10/2000 | Kuo |
| 6,280,046 | B1 | 8/2001 | Perez |
| 6,523,973 | B2 | 2/2003 | Galli |
| 6,530,672 | B2 | 3/2003 | Galli |
| 2003/0072151 | A1 | 4/2003 | Galli |
| 2003/0076674 | A1 | 4/2003 | Galli |

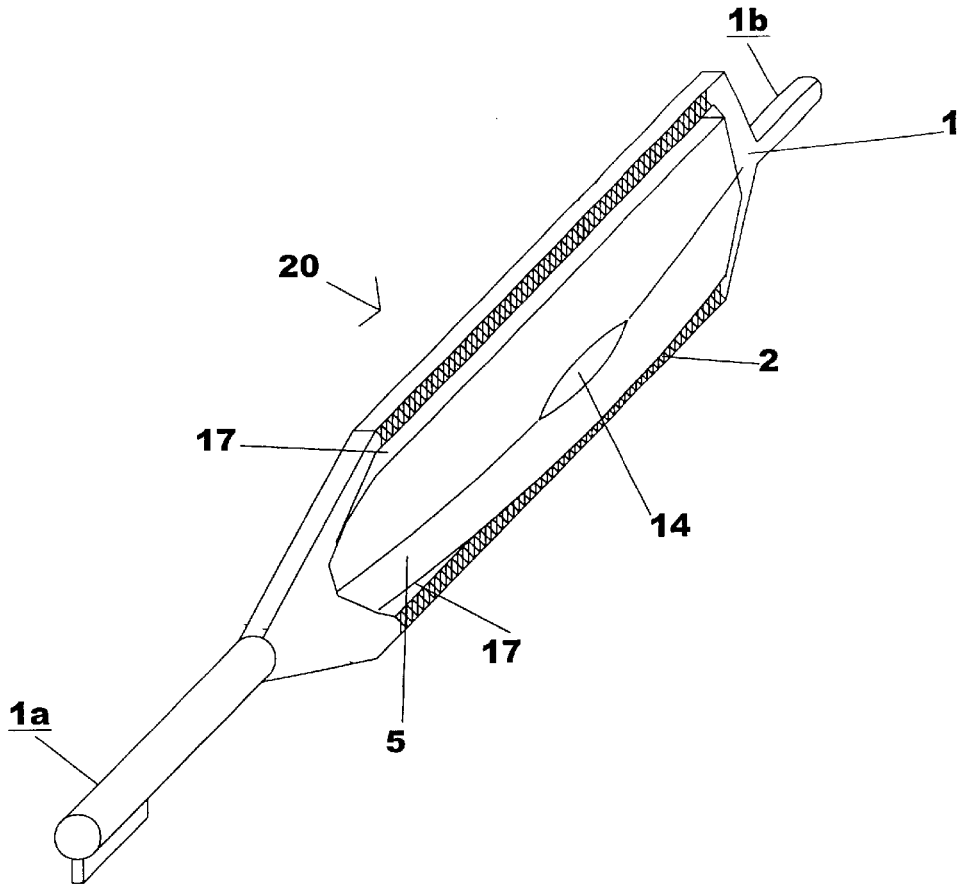
FIGURE 1 (AMENDED)

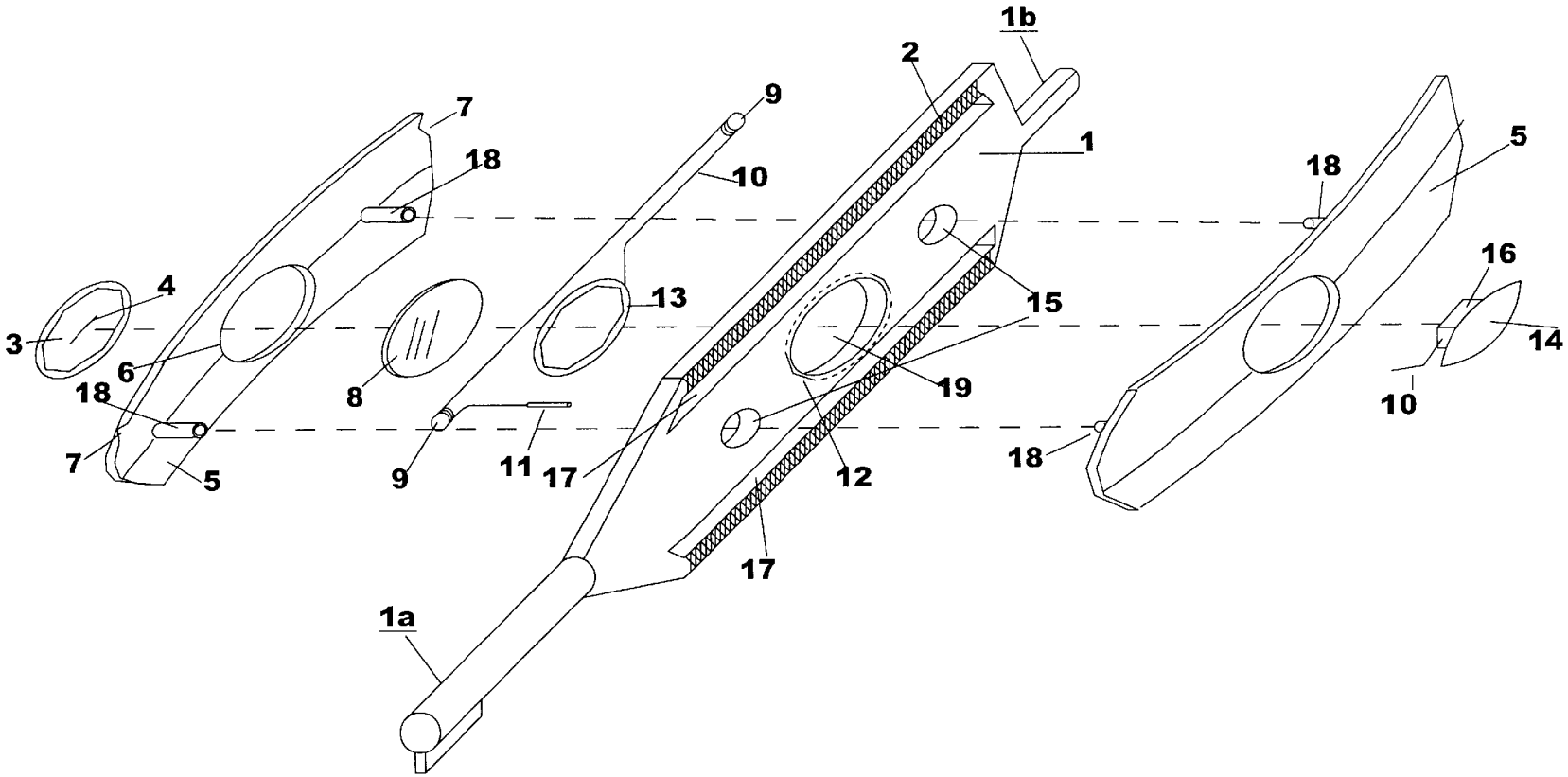
FIGURE 2 (AMENDED)

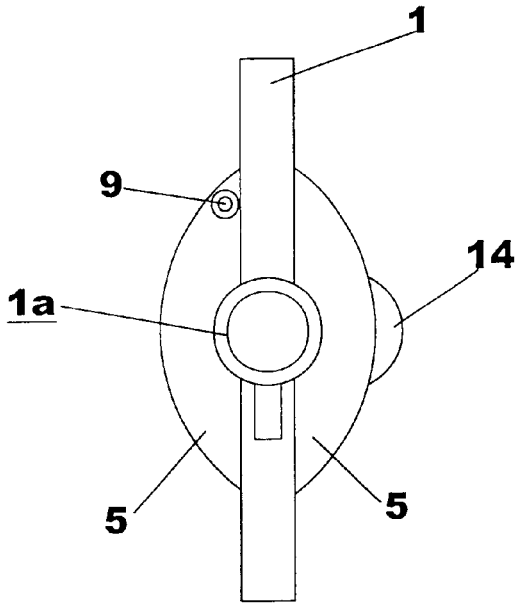
FIGURE 3 (AMENDED)
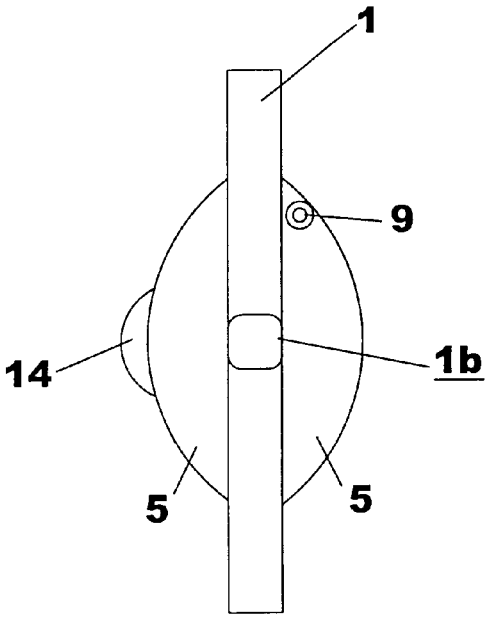
FIGURE 4 (AMENDED)

FIGURE 5 (AMENDED)
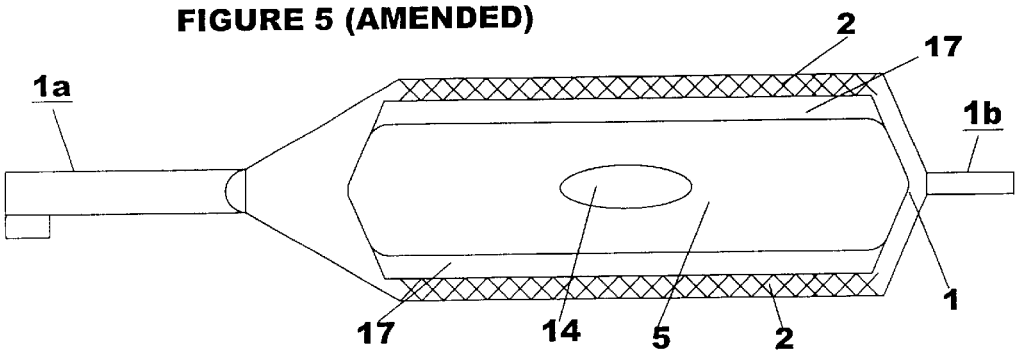
FIGURE 6 (AMENDED)
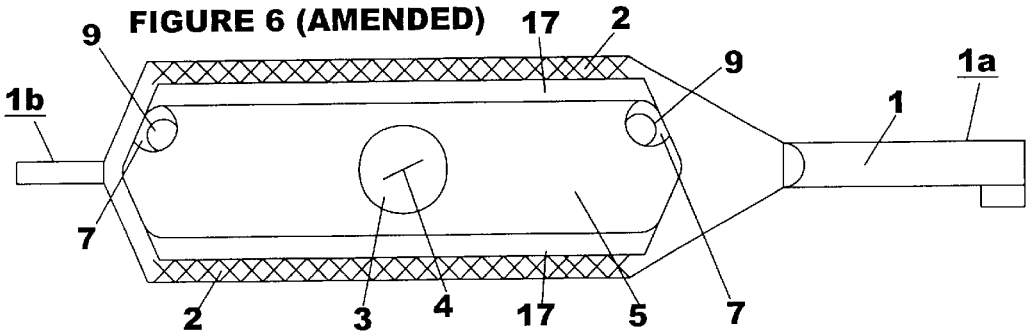
FIGURE 7 (AMENDED)
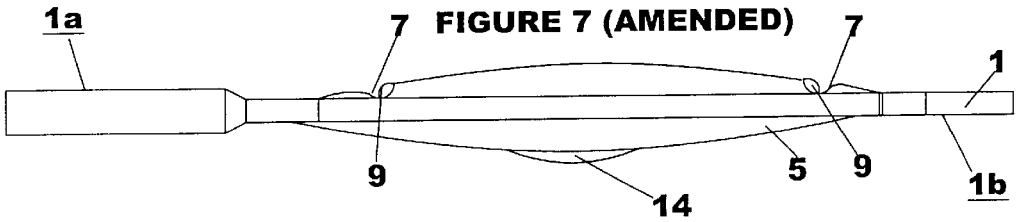
FIGURE 8 (AMENDED)
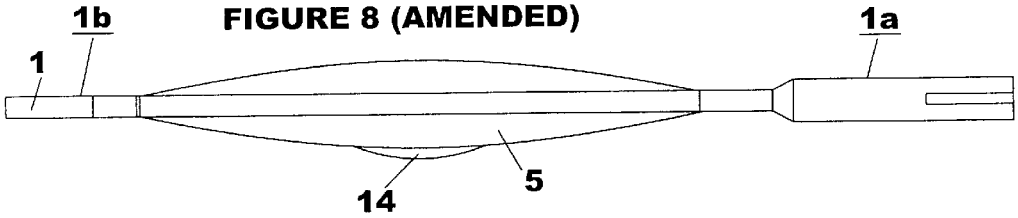

HANDCUFF KEY WITH ILLUMINATION

Matter enclosed in heavy brackets [ ] appears in the original patent but forms no part of this reissue specification; matter printed in italics indicates the additions made by reissue.

BACKGROUND OF THE INVENTION

This invention relates to a handcuff key. Particularly to a handcuff key with built in illumination. With a cell that is connected to two light emitting diodes in an enclosed case that has a depression button that upon depression closes the electric circuit inside the casing and activates the light emitting diodes. The light then illuminates towards both ends of the key. This then allows for the illumination of handcuff locks in dim lighting.

U.S. Pat. No. 5,730,013 to Wen-Sheng Huang has a key structure with illumination that is used for certain types of locks and keys.

U.S. Pat. No. 4,521,833 to Heinz Wolter has a light built in to certain types of keys.

U.S. Pat. No. 5,541,817 to Chien-Lun has a key with a built in light.

Before the above prescribed time there has been no handcuff key with illumination. Since handcuffs are usually put on people's hands behind their backs it drastically reduces light due to the proximity of the hands and the body. A person using a handcuff key in dim lighting would have to use one hand for a flashlight to illuminate the handcuff keyholes and the other to operate the key. The handcuff key with illumination eliminates the above problem.

SUMMARY OF THE INVENTION

According to the present invention a handcuff key that is partially enclosed in a grip housing having the ends of the handcuff key plate extending out of the housing. The external portions of the middle of the handcuff key plate are ribbed and attach to the external portions of the handcuff key plate. The grip housing fits in the length of the parallel slots along the longitude of the key plate. The grip housing is attaches through holes in the key plate via circular complimenting attaching means. The grip housing has a depression button on one side and a threaded notched cover that can be removed for cell replacement on the other.

The grip housing includes a cell that sits in a recess on one side of the handcuff key plate and is lined with a circular conductive strip. The recess surrounds a hole that is integrated in with the structure of the key. An insulated wire is connected to the circular conductive strip and runs to the terminals of two light emitting diodes and then to another conductive strip that is affixed to the internal side of a depression button. The two light emitting diodes sit in grooved slots of the grip housing and face opposite each other toward the respective ends of the handcuff key plate. By depressing a depression button on the outside of the grip housing the conductive strip that is connected to the insulated wires contacts the cell through the handcuff key plate hole and forms a closed circuit so that the two light emitting diodes illuminate a light beam that will extend towards both ends of the key.

Therefore in low lighting a user can use the key and eliminate the problem of holding a flashlight and using a handcuff key at the same time.

An object of the present invention is to provide a handcuff key with two built-in lights for illumination that illuminate both ends of the key plate.

Another object of the present invention is to have a handcuff key plate that is partially enclosed in a grip housing that has an easy way to replace a cell via a threaded cell cover that has a notch to turn it.

Another object of the present invention is to have a depression button that once depressed, it completes and closes an electric circuit that is connected to a cell and then empowers the light emitting diodes. Therefore power is only taken during the process of the pressing of the depression button.

Another advantage and object of the present invention is to have two light emitting diodes. This allows for illumination and allows both uses of a handcuff key to be utilized in dim lighting.

Further advantages and objects of the handcuff key with illumination will become easy to see from the following brief description of the drawing and understood when read in connection with the detailed description of the drawing.

BRIEF DESCRIPTION OF THE SEVERAL VIEWS OF THE DRAWING

FIG. 1 is a perspective assembled view of the present invention

FIG. 2 is a perspective exploded view of the present invention

FIG. 3 is a perspective assembled view from the front of the present invention FIG. 4 is a perspective assembled view from the rear of the present invention FIG. 5 is a perspective assembled view from the left of the present invention FIG. 6 is a perspective assembled view from the right of the present invention FIG. 7 is a perspective assembled view from the bottom of the present invention FIG. 8 is a perspective assembled view from the top of the present invention

DETAILED DESCRIPTION OF THE INVENTION

Referring to FIG. 1, there is shown a perspective assembled view of a handcuff key with illumination 20, in accordance with the present invention.

As shown in FIG. 1–8, the handcuff key plate 1, is integrally formed to include three holes 15 and 19, along the length of the key plate 1, with the center hole 19, being larger. *Key plate 1 includes an unlocking or key end 1a and a double-locking or pin end 1b.* The center hole 19 is surrounded on one side with a recess 12. Part of the handcuff key plate 1, is surrounded with a grip housing 5. The grip housing 5, fits in the length of the parallel slots 17, along the longitudinal of the key plate 1. The grip housing 5 attaches together through holes 15, at each end of the key plate 1, via circular complimenting attaching means 18, *whereby key end 1a and pin end 1b extend from grip housing 5 in different directions.* The grip housing 5 that encloses part of the handcuff key plate 1, includes the recess 12, which is lined with a circular conductive strip 13, and holds a cell 8, on one side of the handcuff key plate 1. The cell 8 would then sit in the recess 12, on the circular conductive strip 13.

The circular conductive strip 13, is attached to a wire 10, that connects to one light emitting diode 9, that points towards one end of the handcuff key plate 1. The wire 10, then continues and connects to another light emitting diode 9, that faces opposite the other. The light emitting diodes 9, sit in grooved slots 7, and point to the respective ends *1a, 1b,* of the handcuff key plate 1. The wire 10, then runs and attaches to a conductive strip 16. The conductive strip 16 attaches to the under side of a depression button 14. The wire 10, is covered with wire insulation 11, except at the connection and attachment points.

By depressing the depression button 14, it moves the attached conductive strip 16, through the hole 15, of the handcuff key plate 1, and contacts the cell 8, and closes the electric circuit and powers the two light emitting diodes 9.

In FIG. 1–8, the grip housing 5, that partially encloses the handcuff key plate 1, has on one side a depression button 14. The other side of the grip housing 5, has a threaded cell cover 3, that attaches to the grip housing 5, via a threaded hole 6. The threaded cell cover 3, has a notch 4, that allows for the threaded cell covers 3, rotation and removal for cell 8 replacement.

In FIG. 1, 2, 5, and 6, the external portions of the middle of the handcuff key plate 1, has ribbed grips 2, that attach to the external end portions of the handcuff key plate 1.

It should be noted that the above description and accompanying drawing are only used to illustrate on embodiment of the present invention, not intended to limit the scope thereof. Any modification of the embodiment should fall within the scope of the present invention.

[OBJECTS OF THE INVENTION ] *ELEMENTS OF THE DESCRIBED EMBODIMENT*

1. Handcuff key plate
*1a. Key end*
*1b. Pin end*
2. Ribbed grips
3. Threaded cell cover
4. Notch
5. Case (*Grip housing*)
6. Threaded hole
7. Grooved slot
8. Cell
9. Light emitting diode
10. Wire
11. Wire insulation
12. Recess
13. Circular conductive strip
14. Depression button
15. Hole
16. Conductive strip
*17. Parallel slots*
*18. Attaching means*
*19. Center hole.*

What is claimed is:

1. A handcuff key comprising:

a handcuff key plate (1) having two opposite ends, three holes (15 and 19), with the center hole (19) being larger and surrounded on one side by a recess (12); the other holes (15) are opposite each other at the end of the key plate (1), said key plate having two ribbed grips (2) at opposing lateral sides;

a grip housing (5) is attached to the center of the key plate (1) via circular attaching means (18) and fits in the length of the parallel slots (17) along the longitudinal of the key plate (1), said grip housing attaches to the key plate (1) between the two ribbed grips (2) and having the two opposite ends of the handcuff key plate (1) extending from the grip housing (5);

a illumination circuit contained within the grip housing (5), the illumination circuit includes two light emitting diodes (9) connected by wire (10), said wire being insulated (11) and a circular conductive strip (13) to a battery cell (8) to another conductive strip (16) that attaches to the inner side of a depression button (14);

a threaded cell cover (3) has a notch (4) at the middle of an external portion;

said grip housing (5) includes two grooved slots (7) at opposite ends where each light emitting diode (9) is positioned to illuminate the opposite ends of the key plate (1), said grip housing (5) includes said depression button (14) and a threaded hole (6) positioning the battery cell (8) above the center hole (19) and recess (12) of the key plate (1);

said threaded cell cover (3) covers the threaded hole (6)

wherein when said depression button is depressed said illumination circuit illuminates both ends of said handcuff key plate.

*2. A handcuff key comprising:*

*a handcuff key plate having two opposite ends, three holes, with the center hole being larger and surrounded on one side by a recess; the other holes are opposite each other at the end of the key plate, said key plate having two ribbed grips at opposing lateral sides;*

*a grip housing is attached to the center of the key plate via circular attaching means and fits in the length of the parallel slots along the longitude of the key plate, said grip housing attaches to the key plate between the two ribbed grips and having the two opposite ends of the handcuff key plate extending from the grip housing;*

*a illumination circuit contained within the grip housing, the illumination circuit includes two light emitting diodes connected by wire, said wire being insulated, and a circular conductive strip to a battery cell to another conductive strip that attaches to the inner side of a depression button;*

*a threaded cell cover has a notch at the middle of an external portion;*

*said grip housing includes two grooved slots at opposite ends where each light emitting diode is positioned to illuminate the opposite ends of the key plate,*

*said grip housing includes said depression button and a threaded hole positioning the battery cell above the center hole and recess of the key plate;*

*said threaded cell cover covers the threaded hole,*

*wherein when said depression button is depressed said illumination circuit illuminates both ends of said handcuff key plate.*

*3. A handcuff key comprising:*

*a handcuff key plate having two opposite ends and a hole surrounded on one side by a recess;*

*a grip housing is attached to the center of the key plate and having the two opposite ends of the handcuff key plate extending from the grip housing;*

*a illumination circuit contained within the grip housing, the illumination circuit includes two light emitting diodes connected by wire to a battery cell and a depression button;*

*a cell cover has a notch at the middle of an external portion;*

*said grip housing includes two grooved slots at opposite ends where each light emitting diode is positioned to illuminate the opposite ends of the key plate,*

*said grip housing includes said depression button and a hole positioning the battery cell above the hole and recess of the key plate;*

*said cell cover covers the hole,*

*wherein when said depression button is depressed said illumination circuit illuminates*

*both ends of said handcuff key plate.*

*4. A handcuff key comprising:*

*a handcuff key plate having two opposite ends and a center hole;*

*a housing attached to the key plate and having the two opposite ends of the handcuff key plate extending from the housing,*

*wherein the housing includes a depression button proximate a battery disposed in the center hole of the key plate;*

*an illumination circuit within the housing, the illumination circuit including two light emitting diodes connected to the battery responsive to the depression button; and*

*wherein the housing includes slots at opposite ends, wherein each light emitting diode is positioned in a respective slot to illuminate the respective opposite ends of the key plate,*

*whereby, when the depression button is depressed, the illumination circuit illuminates the two opposite ends of the handcuff key plate.*

*5. A handcuff key comprising:*

*a housing having opposite ends of a handcuff key extending therefrom,*

*the housing including a depression button proximate a battery enclosed by the housing and having slots near the opposite ends of the handcuff key, respectively;*

*two light emitting diodes, one in each of the slots of the housing for illuminating the opposite ends of the handcuff key, respectively;*

*an illumination circuit within the housing, the illumination circuit including the two light emitting diodes connected to the battery responsive to the depression button;*

*whereby, when the depression button is depressed, the illumination circuit illuminates the opposite ends of the handcuff key.*

*6. A handcuff key comprising:*

*a housing having a key end and a pin end of a handcuff key extending therefrom,*

*the housing including a depression button proximate a battery enclosed by the housing and having slots near the key end and the pin end of the handcuff key, respectively;*

*two light emitting diodes each in one of the slots of the housing for illuminating the key end and the pin end, respectively;*

*an illumination circuit within the housing, the illumination circuit including the two light emitting diodes connected to the battery responsive to the depression button;*

*whereby, when the depression button is depressed, the illumination circuit illuminates the key end and the pin end of the handcuff key.*

*7. In a handcuff key comprising a key end and a pin end and a housing therebetween:*

*a battery enclosed in said housing;*

*first and second light emitting diodes in said housing and positioned for illuminating in the respective directions of the key end and the pin end of said housing, respectively;*

*a depressable button in said housing for selectively connecting said battery and said first and second light emitting diodes in an illumination circuit,*

*wherein, when said depressable button is depressed, said illumination circuit causes said first and second light emitting diodes to illuminate the key end and the pin end of said handcuff key.*

*8. The handcuff key of claim 7 wherein said housing includes a central hole enclosing said battery.*

*9. The handcuff key of claim 7 wherein said housing has first and second slots for receiving the first and second light emitting diodes, respectively.*

*10. The handcuff key of claim 7 further including a wire and a conductive strip, wherein depressing and releasing said depressable button causes said conductive strip to selectively make and break electrical contact.*

*11. The handcuff key of claim 7 further including an electrical conductor, wherein depressing and releasing said depressable button causes said electrical conductor to selectively make and break electrical contact.*

*12. The handcuff key of claim 7 wherein said housing includes a cover for enclosing the battery therein.*

*13. The handcuff key of claim 7 wherein said housing comprises first and second grip housings and means for attaching said first and second grip housings.*

*14. In a handcuff key comprising opposite ends and a housing therebetween:*

*a battery enclosed in said housing;*

*first and second light emitting diodes in said housing and positioned for illuminating in the respective directions of the opposite ends of said housing, respectively;*

*a depressable button in said housing for selectively connecting said battery and said first and second light emitting diodes in an illumination circuit,*

*wherein, when said depressable button is depressed, said illumination circuit causes said first and second light emitting diodes to illuminate the opposite ends of said handcuff key.*

*15. The handcuff key of claim 14 wherein said housing includes a central hole enclosing said battery.*

*16. The handcuff key of claim 14 wherein said housing has first and second slots for receiving the first and second light emitting diodes, respectively.*

*17. The handcuff key of claim 14 further including a wire and a conductive strip, wherein depressing and releasing said depressable button causes said conductive strip to selectively make and break electrical contact.*

*18. The handcuff key of claim 14 further including an electrical conductor, wherein depressing and releasing said depressable button causes said electrical conductor to selectively make and break electrical contact.*

*19. The handcuff key of claim 14 wherein said housing includes a cover for enclosing the battery therein.*

*20. The handcuff key of claim 14 wherein said housing comprises first and second grip housings and means for attaching said first and second grip housings.*

*21. A handcuff key comprising opposite ends and a housing therebetween; and an illumination circuit in said housing,*

*said illumination circuit including a battery in circuit with first and second light emitting diodes positioned for illuminating in the respective directions of the opposite ends of said housing, respectively, and a button for selectively energizing said first and second light emitting diodes,*

*wherein depressing said button energizes said first and second light emitting diodes to illuminate the opposite ends of said handcuff key.*

*22. A handcuff key comprising a key end and a pin end and a housing therebetween; and an illumination circuit in said housing,*

*said illumination circuit including a battery in circuit with first and second light emitting diodes positioned for illuminating in the respective directions of the key end and the pin end of said housing, respectively, and a button for selectively energizing said first and second light emitting diodes,*

*wherein depressing said button energizes said first and second light emitting diodes to illuminate the key end and the pin end of said handcuff key.*

*23. A handcuff key comprising a housing having opposite ends extending therefrom, and an illumination circuit in said housing,*

*said illumination circuit comprising a battery in circuit with first and second lights positioned for illuminating in the respective directions of the opposite ends of said housing, respectively, and a button for selectively energizing said first and second lights,*

*wherein depressing said button switch energizes said first and second lights to illuminate the opposite ends of said handcuff key.*

*24. A handcuff key comprising a housing having a key end and a pin end extending therefrom, and an illumination circuit in said housing,*

*said illumination circuit comprising a battery in circuit with first and second lights positioned for illuminating in the respective directions of the key end and the pin end of said housing, respectively, and a button for selectively energizing said first and second lights,*

*wherein depressing said button energizes said first and second lights to illuminate the key end and the pin end of said handcuff key.*

*25. An article comprising:*

*a handcuff key having first and second ends;*

*first and second lights positioned for illuminating in the respective directions of the first and second ends of said handcuff key; and*

*a button for selectively energizing said first and second lights,*

*wherein depressing said button energizes said first and second lights to illuminate the first and second ends of said handcuff key.*

*26. In a handcuff key comprising first and second ends and a housing therebetween:*

*a battery enclosed in said housing;*

*first and second lights in said housing and positioned for illuminating in the directions of the first and second ends of said housing, respectively;*

*a depressable button in said housing for selectively connecting said battery and said first and second lights in an illumination circuit,*

*wherein, when said depressable button is depressed, said illumination circuit causes said first and second lights to illuminate the first and second ends of said handcuff key.*

*27. A handcuff key comprising:*

*a handcuff key plate having two opposite ends and three holes, wherein the center hole is larger and is surrounded on one side by a recess, the other holes are opposite each other at the end of the key plate, and the key plate has two ribbed grips at opposing lateral sides;*

*a grip housing attached to the center of the key plate via circular attaching means fits in the length of the parallel slots along the longitude of the key plate, wherein the grip housing attaches to the key plate between the two ribbed grips and has the two opposite ends of the handcuff key plate extending from the grip housing;*

*an illumination circuit contained within the grip housing, wherein the illumination circuit includes two light emitting diodes connected by wire, the wire being insulated, and a circular conductive strip to a battery cell to another conductive strip that attaches to the inner side of a depression button; and*

*a threaded cell cover having a notch at the middle of an external portion;*

*wherein the grip housing includes two grooved slots at opposite ends where each light emitting diode is positioned to illuminate the opposite ends of the key plate;*

*wherein the grip housing includes the depression button and a threaded hole positioning the battery cell above the center hole and recess of the key plate;*

*wherein the threaded cell cover covers the threaded hole; and*

*wherein when the depression button is depressed the illumination circuit illuminates both ends of the handcuff key plate.*

*28. A handcuff key comprising:*

*a handcuff key plate having two opposite ends and a hole surrounded on one side by a recess;*

*a grip housing attached to the center of the key plate and having the two opposite ends of the handcuff key plate extending from the grip housing;*

*an illumination circuit within the grip housing, the illumination circuit including two light emitting diodes connected by wire and a circular conductive strip to a battery cell and a depression button; and*

*a cell cover;*

*wherein the grip housing includes two notches at opposite ends where each light emitting diode is positioned to illuminate the opposite ends of the key plate;*

*wherein the grip housing includes the depression button and a hole positioning the battery cell above the hole and recess of the key plate;*

*wherein the cell cover covers the hole of the grip housing; and*

*wherein when the depression button is depressed the illumination circuit illuminates both ends of the handcuff key plate.*

* * * * *